US012574463B2

(12) United States Patent (10) Patent No.: US 12,574,463 B2
Sundar (45) Date of Patent: Mar. 10, 2026

(54) MANAGING A CHARGING OPERATION IN A COMMUNICATION NETWORK

(71) Applicant: Telefonaktiebolaget LM Ericsson (publ), Stockholm (SE)

(72) Inventor: Divya Sundar, Chennai (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 404 days.

(21) Appl. No.: 18/025,070

(22) PCT Filed: Oct. 7, 2020

(86) PCT No.: PCT/IN2020/050861
§ 371 (c)(1),
(2) Date: Mar. 7, 2023

(87) PCT Pub. No.: WO2022/074663
PCT Pub. Date: Apr. 14, 2022

(65) Prior Publication Data
US 2023/0336664 A1 Oct. 19, 2023

(51) Int. Cl.
*H04M 15/00* (2024.01)
*H04W 4/24* (2018.01)

(52) U.S. Cl.
CPC ........... *H04M 15/78* (2013.01); *H04M 15/41* (2013.01); *H04M 15/49* (2013.01); *H04W 4/24* (2013.01)

(58) Field of Classification Search
CPC ...... H04M 15/78; H04M 15/41; H04M 15/49; H04M 15/51; H04M 15/852;
(Continued)

(56) References Cited

U.S. PATENT DOCUMENTS

| 6,597,776 | B1 * | 7/2003 | Walker | ................. | H04M 17/00 |
| | | | | | 379/127.01 |
| 2001/0023180 | A1 * | 9/2001 | Sauer | ................. | H04M 17/106 |
| | | | | | 455/406 |

(Continued)

FOREIGN PATENT DOCUMENTS

| CN | 1968106 A | 5/2007 |
| EP | 3107240 A1 | 12/2016 |
| WO | 2020119900 A1 | 6/2020 |

OTHER PUBLICATIONS

International Search Report and Written Opinion of the International Searching Authority, PCT/IN2020/050861, mailed Jan. 19, 2021, 7 pages.

(Continued)

*Primary Examiner* — Pakee Fang
(74) *Attorney, Agent, or Firm* — Sage Patent Group

(57) ABSTRACT

The present disclosure relates to a method for managing a charging operation in a communication network. The present disclosure also relates to a controller and to a computer program and a computer program product configured, when run on a computer to carry out a method for managing a charging operation in a communication network. Examples provide a method of managing a charging operation in a communications network, the method including: determining a low balance condition of a user of the network during a network service provided to the user by the network; determining a prioritized provider and transferring a credit to the user from the prioritized provider to the user in order to continue the network service; wherein the prioritized provider is determined from a plurality of providers based on respective connectivity parameters between the user and each provider and a respective credit parameter of each provider.

16 Claims, 5 Drawing Sheets

(58) Field of Classification Search
CPC .... H04M 17/206; H04M 15/83; H04M 15/00;
H04M 17/20; H04M 17/201; H04M
17/202; H04M 17/204; H04W 4/24;
H04L 12/14
See application file for complete search history.

(56) References Cited

U.S. PATENT DOCUMENTS

| | | | |
|---|---|---|---|
| 2003/0083990 A1* | 5/2003 | Berg ................. | H04M 15/7655 |
| | | | 705/40 |
| 2007/0072584 A1* | 3/2007 | Jain .................... | H04M 15/745 |
| | | | 455/406 |
| 2011/0145086 A1 | 6/2011 | Valdes et al. | |
| 2011/0246292 A1* | 10/2011 | Satyavolu ......... | H04M 15/8044 |
| | | | 705/14.49 |
| 2014/0372287 A1 | 12/2014 | Tornkvist | |
| 2015/0044989 A1 | 2/2015 | De Foy et al. | |
| 2022/0022011 A1* | 1/2022 | Bhatnagar ........... | H04M 15/765 |

OTHER PUBLICATIONS

Communication regarding European Search Report for European
Patent Application No. 20956646.2 mailed Oct. 18, 2023, 10 pages.

* cited by examiner

300

| Provider ID | Connectivity | Credit | Priority |
|---|---|---|---|
| B | 1 | 0 | 3 |
| C | 2 | 3 | 1 |
| D | 3 | 5 | 2 |

310a

310b

325

Learning Agent

Controller

Interfaces 330          320

Updated Data          Requests/ Transfers

400

410     420

425

430

Determine low balance condition of user during network service — 440

Determine prioritized provider using connectivity parameters and credit parameters — 445

Transfer credit from prioritized provider to user to continue network service — 450

500

600

605

CDR

555

Charging
Function

550

User Tables

620 — Determine connectivity parameters of providers
using learning agent and CDR 625 — Determine credit parameters of providers 630 — Determine priority order of providers based on
connectivity and credit parameters

MANAGING A CHARGING OPERATION IN A COMMUNICATION NETWORK

CROSS REFERENCE TO RELATED APPLICATIONS

This application is a 35 U.S.C. § 371 national stage application of PCT International Application No. PCT/IN2020/050861 filed on Oct. 7, 2020, the disclosure and content of which is incorporated by reference herein in its entirety.

TECHNICAL FIELD

The present disclosure relates to a method for managing a charging operation in a communication network. The present disclosure also relates to a controller and to a computer program and a computer program product configured, when run on a computer to carry out a method for managing a charging operation in a communication network.

BACKGROUND

Fourth generation (4G) mobile communications networks offered improved mobility and connectivity over earlier version networks. The evolution to fifth generation networks will offer increased bandwidth and speed, among other advantages, and will be able to support highly data intensive services. With Over the Top (OTT) service providers experiencing ever increasing subscriber numbers, some estimates predict that up to 90% of traffic on 5G will be mobile video. The popularity of gaming and other interactive services is also driving a rise in demand for Augmented and Virtual Reality content. Such content can be in excess of 33 times more data intensive than 480p video. Furthermore, collaboration between different business partners to deliver complex consumer products is increasing. Facilitating the provision of such content and complex products is an ongoing challenge as is the charging for their delivery.

Patent publication CN1968106B describes a charging system in which a network customer has multiple account balances across real-time and sub-real time accounts, such as prepaid and postpaid accounts owned by the customer. This allows a customer or user of the network to transfer balances between accounts to accommodate use of different services.

SUMMARY

It is an aim of the present disclosure to provide a method, apparatus and computer readable medium which at least partially address one or more with known charging methods and systems.

According to certain embodiments described herein, there is provided a method of managing a charging operation in a communications network. The method comprises determining a low balance condition of a user of the network during a network service provided to the user by the network and determining a prioritized provider and transferring a credit to the user from the prioritized provider in order to continue the network service. The prioritized provider is determined from a plurality of providers based on respective connectivity parameters between the user and each provider and a respective credit parameter of each provider.

By determining a prioritised provider and transferring credit to the user, the network service may continue uninterrupted without user input resulting in an improved experience with the credit transfer being handled in the background. The use of a prioritized provider(s) also minimizes network traffic.

According to certain embodiments described herein there is provided a controller for managing a charging operation in a communication network. The controller comprises a processor and a memory which contains instructions executable by the processor such that the controller is operable to determining a low balance condition of a user of the network during a network service provided to the user by the network, determine a prioritized provider, and transferring a credit to the user from the prioritized provider to continue the network service. The prioritized provider is determined from a plurality of providers based on respective connectivity parameters between the user and each provider and a respective credit parameter of each provider.

According to certain embodiments described herein there is provided a computer program comprising instructions which, when executed on a processor, causes the processor to carry out the methods described herein. The computer program may be stored on a non transitory computer readable media.

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION

Figure 1:
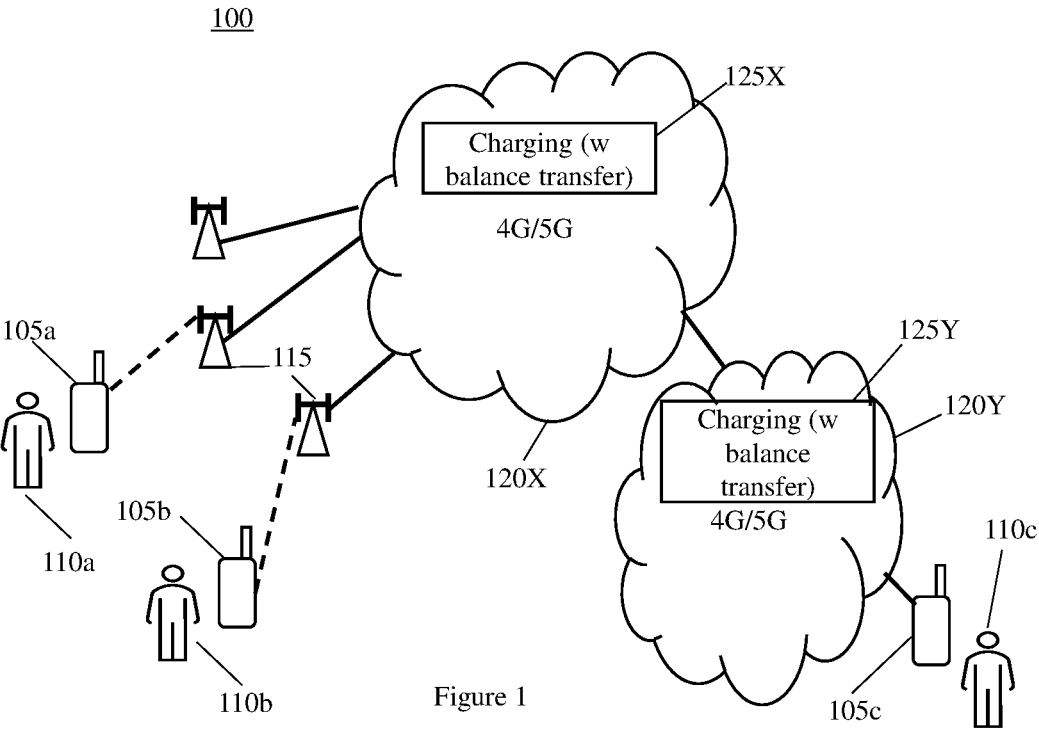
FIG. 1 illustrates a communications network architecture according to an example.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives feature and advantages of the enclosed embodiments will be apparent from the following description.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions. Memory may be employed to storing temporary variables, holding and transfer of data between processes, non-volatile configuration settings, standard messaging formats and the like. Any suitable form of volatile memory and non-volatile storage may be employed including Random Access Memory (RAM) implemented as Metal Oxide Semiconductors (MOS) or Integrated Circuits (IC), and storage implemented as hard disk drives and flash memory.

Embodiments described herein relate to methods and apparatus for balance transfer between different users of a communications network, or between users of different communications users. For simplicity of explanation, users providing the balance transfer are herein referred to as "providers". The facilitation of balance transfers from a provider to a user within the communications network enables fast and, in some examples, automatic continuance of network services when the user experiences a low balance condition. This improves the user's network service experience but also reduces the network traffic which would otherwise be required, including for example to external entities such as banks.

FIG. 1 is a schematic diagram illustrating a communications system of communications networks according to an example. The communications system 100 includes two or more communications network 120X, 120Y which may be operated by different operators and may operate according to standards of the Third Generation Partnership Project (3GPP) such as those corresponding to 2G, 3G, 4G, 5G, as well as other standards such as WLAN for example. Each network 120X, 120Y will have a number of base stations 115 (shown only for network 120X for simplicity) which allow for wireless connection to a user 110a-110c via their respective user equipment (UE) 105a-105c in order to provide network services to the users. For example, a user 110a of one network 120X may call a user 110c of another network 120Y.

Figure 2:
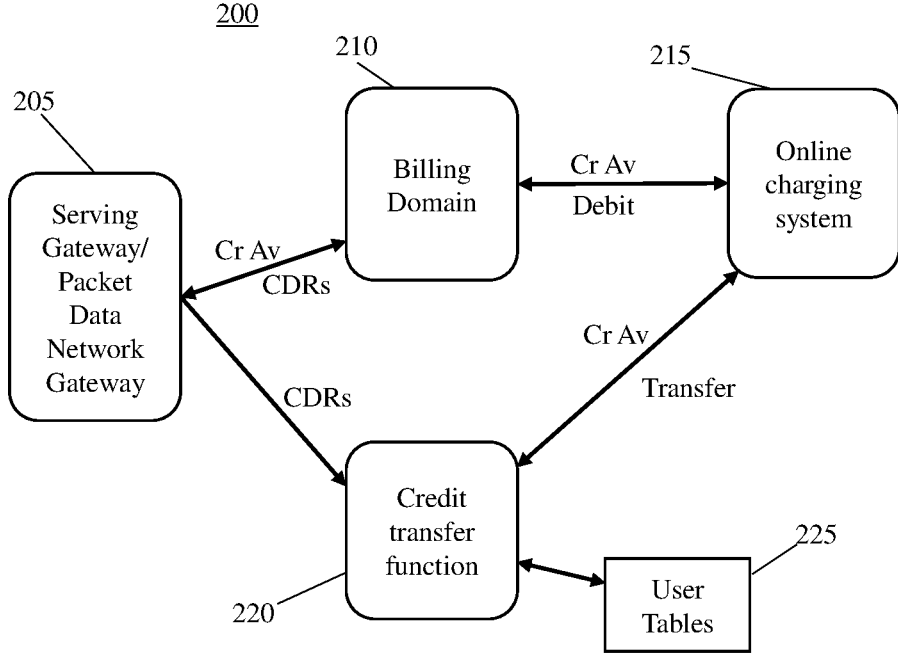
FIG. 2 is a schematic diagram of functional modules in a communications network according to an example.

Each network 120X, 120Y will include charging functionality 125X, 125Y implemented on one or more hardware nodes according to a corresponding standard. These charging functions may also be modified as described below to enable real time transfer of balances from a provider 110b, 110c to a user 110a FIG. 2 is a schematic diagram of a system 200 of functional modules in a communications network associated with the charging function. Some or all the different functional module may be implemented in separate network hardware nodes or servers, requiring network traffic signals between them to interact. The functional nodes include a gateway 205, a billing domain 210, and an online charging system 215. These functional modules can be found in a typical 3G or 4G network.

Charging is typically performed on a per-connection basis with different gateways 205 performing accounting operations by recording call durations or data volumes of packets which traverse them, to or from a user. This example uses Serving GPRS Support Node (SGSN) and Gateway GPRS Support Node (GGSN) although other types of gateway could alternatively be used. SGSN handles data packet delivery to and from a UE within its geographical service area. GGSN acts as a router between a SGSN and an external network such as the Internet or another communications network operated by a different operator. The billing domain 210 receives charging data records (CDR) from the Gateways 205 indicating the amount of data used by a user so that they can be billed accordingly. This may be done offline, that is the billing domain 210 periodically bills the user for data used over the period. Charging may also be done online where the user provides a pre-paid credit balance before using network services. In this case the online charging system 215 authorizes whether and how much credit the user has available for network services so that the gateways 205 can provide the service. The gateways 205 then deduct data usage from the available credits or balance and stops the service when the user's balance reaches zero credit.

The system 200 additionally includes a credit transfer function 220 associated with user tables 225. The credit transfer function 220 facilitates credit from the balance of a provider 105b, 105c to be transferred to a user 105a. This transfer may be triggered when the user reaches a low balance condition and may be implemented automatically using a pre-authorized agreement between user and provider, or by automatically initiating a request to the provider. The low balance condition may be any pre-set limit associated with a network service, such as a number of call minutes remaining or a number of megabytes (MB) of data remaining.

Figure 3:
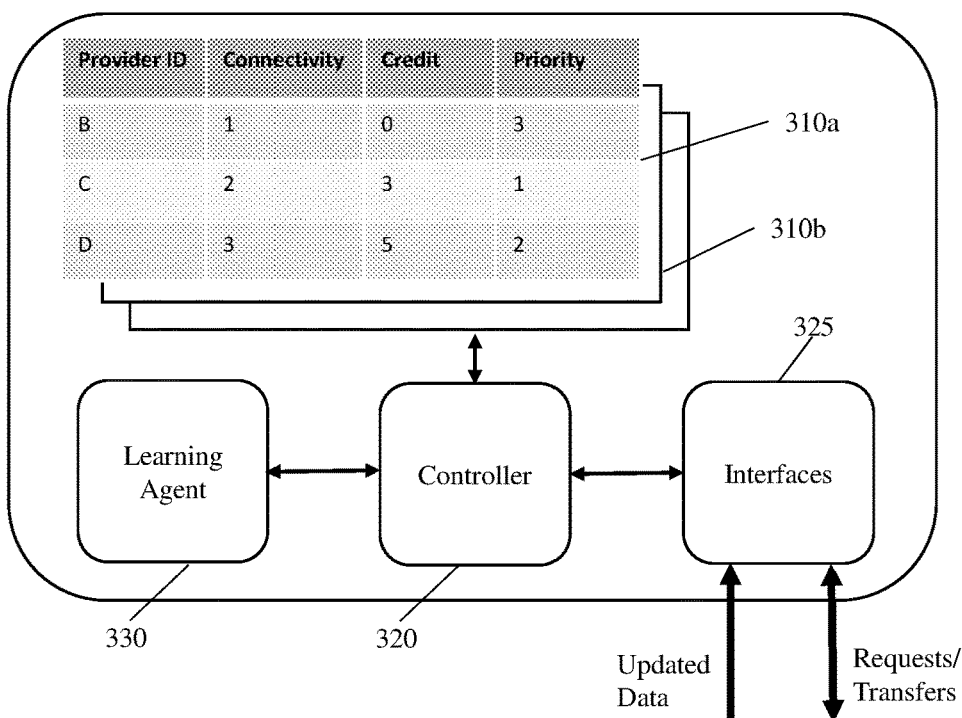
FIG. 3 is a schematic diagram of a credit transfer function according to an example.

FIG. 3 illustrates a credit transfer function 300 comprising user tables 310a, 310b corresponding to several users 110a, 110b, a controller 320, one or more interfaces 325 and a learning agent 330. In this example, each user table 110a, 110b comprises a list of provider ID's together with a respective connectivity parameter and credit parameter. The table may also comprise a priority ranking of the providers.

The connectivity parameter may be a ranking corresponding to the level of interaction between the user and the respective provider using network services. The level of interaction may be determined using several metrics over a period, including for example the number of calls, the duration of calls, the number of short Message Service (SMS) messages or texts exchanged, the amount of data exchanged. These metrics may be combined according to various algorithms and/or may be determined using the learning agent 330 as described in more detail below. Alternatively, the connectivity parameters may include the metrics themselves.

The credit parameters may include the credit balance of the respective provider, or a pre-agreed part of that balance. The balance may be specific to the service being considered for balance transfer, for example call credit of the provider to enable balance transfer to call credit of the user. Alternatively, or additionally, a rating or conversion formula may be used to transfer from one type of credit balance of the provider to a different type of balance of the user, for example call credits to SMS credits. The type of credits transferred may be for specific network services such as calls or data transfer, or they may be non-specific units such customer credits, vouchers or units such as money of one or more currencies. In some examples, credits from a provider subscriber to a different communications network may be transferred to the user. This may be performed using a rating or conversion formula agreed between the operators of the two networks. The credit parameter may alternatively comprise a flag or indicator that the system should send a request to and await confirmation from a provider to confirm that a pre-agreed credit amount can be transferred to a user or to indicate what, if any, amount of credit can be transferred. The credit parameter may be updated periodically by the system, for example based on the providers own use of network services.

The priority index or ranking indicates the order in which to seek a balance transfer from the providers. This will depend on both the connectivity parameter and credit parameter of the providers. For example, a close friend of the user may have a high level of interaction but a low credit balance themselves and so be unable to transfer credit. However, a less contacted provider may have plenty of available credit.

The interfaces 325 may interface with other functional components of the network such as an online charging system 215 or a gateway 205. These enable the network to update the user tables with respective provider credit parameters or information as well as respective provider connectivity parameters or information. The controller 320 may interpret the received information to update the user tables 310*a*, 310*b* and may request transfers between providers and users by for example instructing an interface 325 to signal the online charging system 215 to credit a user and debit a provider.

In an example, the controller 320 may receive the current credit balance of a provider and, knowing of a pre-agreed maximum credit transfer amount from the provider to the user, updates the providers credit parameter. The controller 320 may also receive CDR for a user and uses the learning agent 330 to recalculate and update the connectivity parameter for each provider. The controller 330 may also receive the current credit balance of a user and determine that the user has a low balance condition or may receive an indication of the same for example from an online charging system 215.

Figure 4:
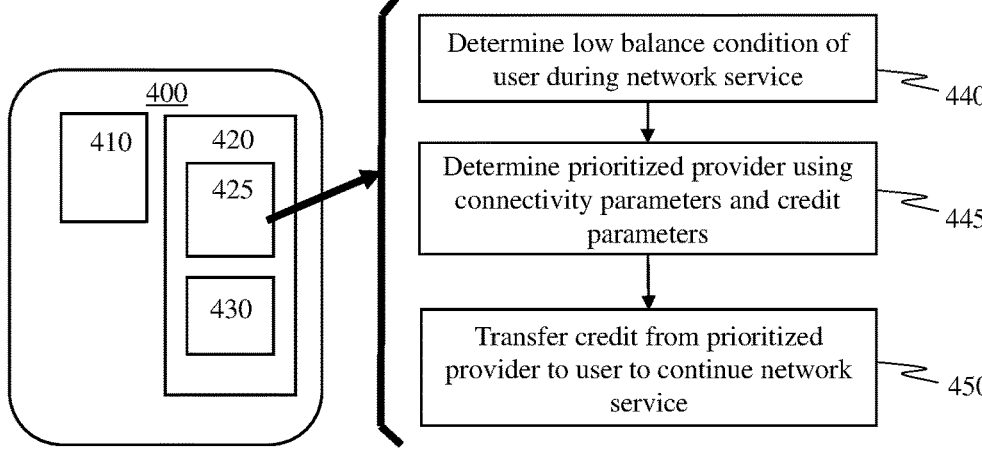
FIG. 4 is a schematic diagram illustrating the architecture of a controller according to an example.

FIG. 4 is a schematic diagram illustrating the architecture of a controller 400 according to an example. The controller 400 comprises a processor 410, memory 420 containing computer program instructions 425 which when executed by the processor cause the processor to carry out methods of the embodiments. The memory also comprises a learning agent 430. An example method is illustrated which includes several steps which may be performed by the controller 400.

At a first step 440, the method determines a low balance condition of a user during a network service. As noted above this may be determined using received credit balance information or signaling from other parts of the network.

At a second step 445, the method determines a prioritized provider using connectivity and credit parameters. This may be implemented using a user table and retrieving the priority ranking or retrieving the credit and connectivity parameters of the available providers and determining an initial, preferred or prioritized provider. The prioritized provider may also be determined using a request to the provider for credit transfer—failure of the request may result in determining another provider having suitable credit and/or connectivity parameters as will be described in more detail below.

At a third step 450, the method transfers credit from the prioritized provider to the user to continue the network service. This can avoid network service interruption for the user and the balance transfer can be achieved automatically.

Figure 5:
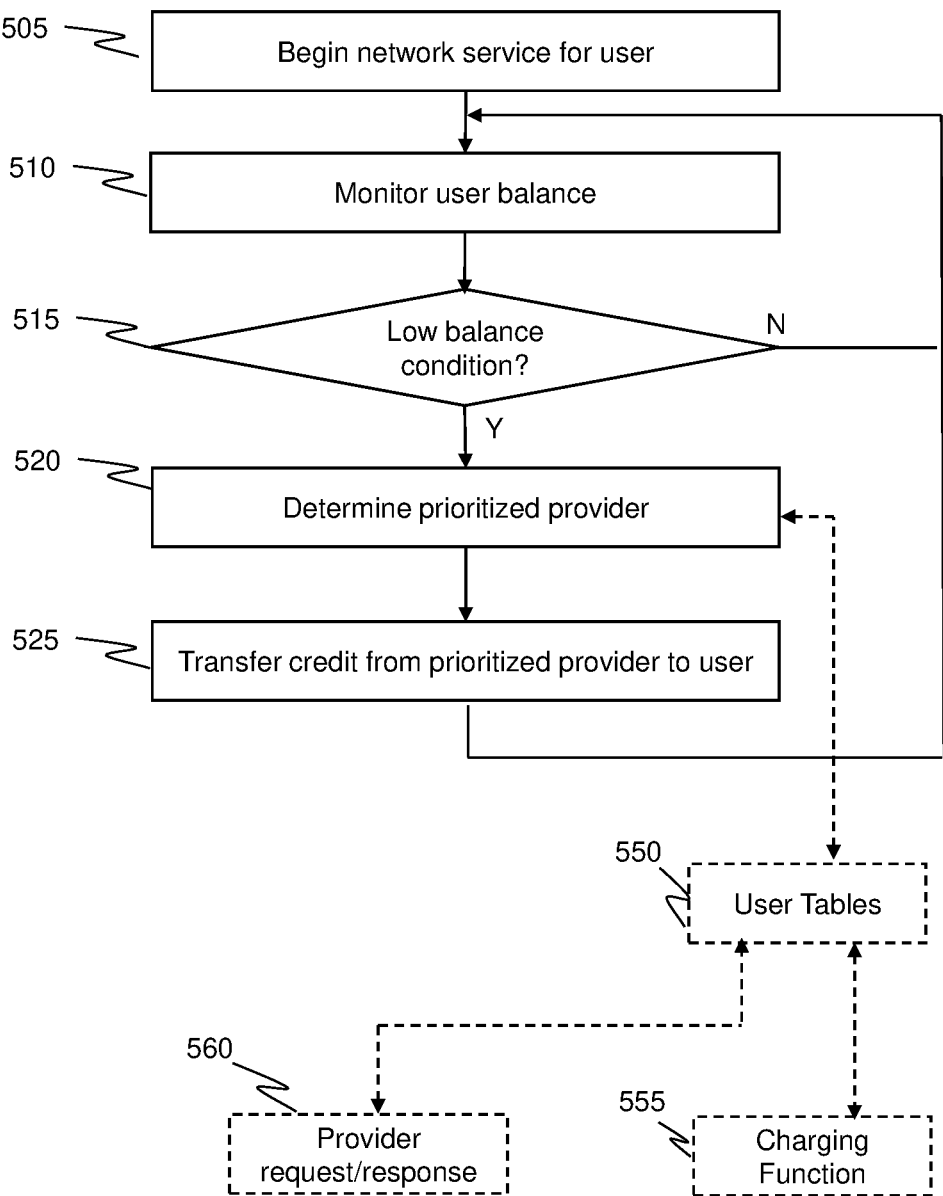
FIG. 5 is a flow chart illustrating process steps in a method for transferring a balance from a provider to a user in a communication network and according to an example.

FIG. 5 is a flow chart illustrating process steps in a method 500 for managing a charging operation in a communication network. The method may be implemented by a controller in a balance transfer module such as that described with respect to FIG. 2, or it may be implemented by several network entities.

The method provides a seamless balance transfer between one or more providers to a user or "consumer". In this example a list of providers is prioritized using a user table and a balance is transferred during an ongoing network service or session. The providers are determined by learning the close contacts of the consumer by analyzing the connections during over a predetermined period, for example using CDR data over the last 3 months. The providers are prioritized based on the closeness of their connection with the user by determining a connectivity parameter by on analysis of the connections between the provider and user.

The providers may also be prioritized according to their ability to transfer credit to the user which may depend on their current credit balance as well as their transfer preferences such as how much credit they are willing to transfer to the user. This may be determined in advance where a pre-approved amount of credit may be transferred automatically when a set condition occurs, for example the user's balance falls below a set amount. Alternatively, a balance transfer may be determined in real-time in response to an automated request to a provider to transfer a balance to the user, which if approved is then automatically transferred to enable continued network service to the user. A credit parameter is determined for each provider based on the credit available to the user from the provider and/or user or provider preferences such as whether to pre-approve a balance transfer or whether to send a request to the provider. For example, where two providers have the same amount of credit available to the user, a provider where this is preapproved may have a higher credit parameter than a provider that requires a request.

The connectivity parameters, credit parameters and provider priority may be calculated automatically in the background according to predetermined algorithms or machine learning, so that they are ready to be used when needed—for example when the user experiences a low credit balance during a network service. In some examples a user may manually adjust the automatically determined priority.

Referring to FIG. 5, at 505 a user begins using a network service such as a voice call, SMS or data transfer. Examples of data transfer may include a video call, an online game, a virtual reality experience, web browsing or checking email.

At 510, the method 500 monitors the user's balance. This may be implemented using a network's charging function, such as an online charging system 215 and/or gateways 205 for example. In a 5G context, this may be implemented using the Nchf interface between a charging function CHF and a rating function ABMF (Account balance management function) to signal a user's balance.

At 515, the method 500 determined whether a low balance condition has occurred for the user. The low balance condition may occur when the credit a user has available for the currently used network service falls below a predetermined threshold, for example 10 MB of data transfer or 2 minutes of call credit. If this is the situation, then the method moves on to 520, otherwise the method returns to 510. This step 515 may be implemented in a controller by comparing the user's balance against a threshold. Alternatively this comparison may be implemented in a separate network entity such a charging function which is configured to send a message to the controller, set a flag which the controller can check periodically, or indicate in some other way that the a low balance condition has occurred.

At 520, the method determines a prioritized provider that can transfer credit to the user. This step is described in more detail below.

At 525, once a prioritized provider has been determined, a balance transfer from this provider to the user is performed in order to allow the user to continue using the network service. This may be implemented by sending a transfer message to an online charging system 215 or other charging function of the network. The transfer message may include a user identifier and credit amount together with a provider identifier and corresponding debit amount. Other details may include the units to be used, the response message may include the users current balance following transfer.

The method may implement a rating or conversion factor, for example crediting the user with only a proportion of the amount debited from the provider, with the difference being a service charge by the network. Credit transferred for different network resources may also involve a conversion factor, for example transferring call credits to data transfer credits. Credit transferred between networks may also involve a conversion factor, for example credit from a provider subscribed to one network operator transferred to a user subscribed to a different network operator may involve a service charge shared between the network operators.

In order to determine a prioritized provider that can provide the required balance transfer to the user, in this example the method looks up a user table 550. The user table 550 may be populated with connectivity and credit parameters as described with respect to FIG. 3, although other user table formats could alternatively be used. The user table may also include a priority ranking so that the method can simply select the highest ranked provider.

The connectivity and credit parameters and the priority ranking may be updated in the background, for example as described with respect to FIG. 6 below. Alternatively, these values may be updated at the time of checking the user table. The credit parameter of the highest ranked provider may be checked before determining this as the prioritized provider, for example by querying a charging function 555 of the network (or a different network). If the provider balance check reveals that the provider can no longer provide the user with a balance transfer, the method moves to the next highest ranked provider and checks their balance and if necessary continues down the prioritized list of providers until one is found that can transfer the required credit to the user. This provider is then returned as the prioritized provider and the balance transfer is initiated.

Some providers may require dynamic authorization where they can confirm or authorize a balance transfer upon request as indicated at step 560. Here, a provider identified by the method as being able to provide the required balance transfer may be flagged in the user table as requiring dynamic authorization. In this case the method sends a request for balance transfer to the provider. This may include details of the user and the amount of credit required. If the provider authorizes the transaction they are returned as the prioritized provider and the balance transfer initiated. If the provider does not authorize the transaction, the method continues down the ranked list of providers until one is found. The method may include a time out period after which if there is no response from the provider the method moves down the ranked provider list.

In an alternative arrangement, the user table may only include connectivity parameters and the providers are initially prioritized based on these. The method then checks the credit parameters of the ranked providers in turn until one can transfer credit to the user. This may include the use of dynamic authorization as noted above or checking the providers current credit parameters by querying the charging function 555 for example.

The user table may include provider preferences such as dynamic authorization and/or the maximum amount of credit that may be transferred to the user. The user table may also include user preferences such as maximum balance transfer amounts for respective providers and even preferred providers where these meet other requirements such as having enough credit to transfer and being sufficiently connected to the user.

Figure 6:
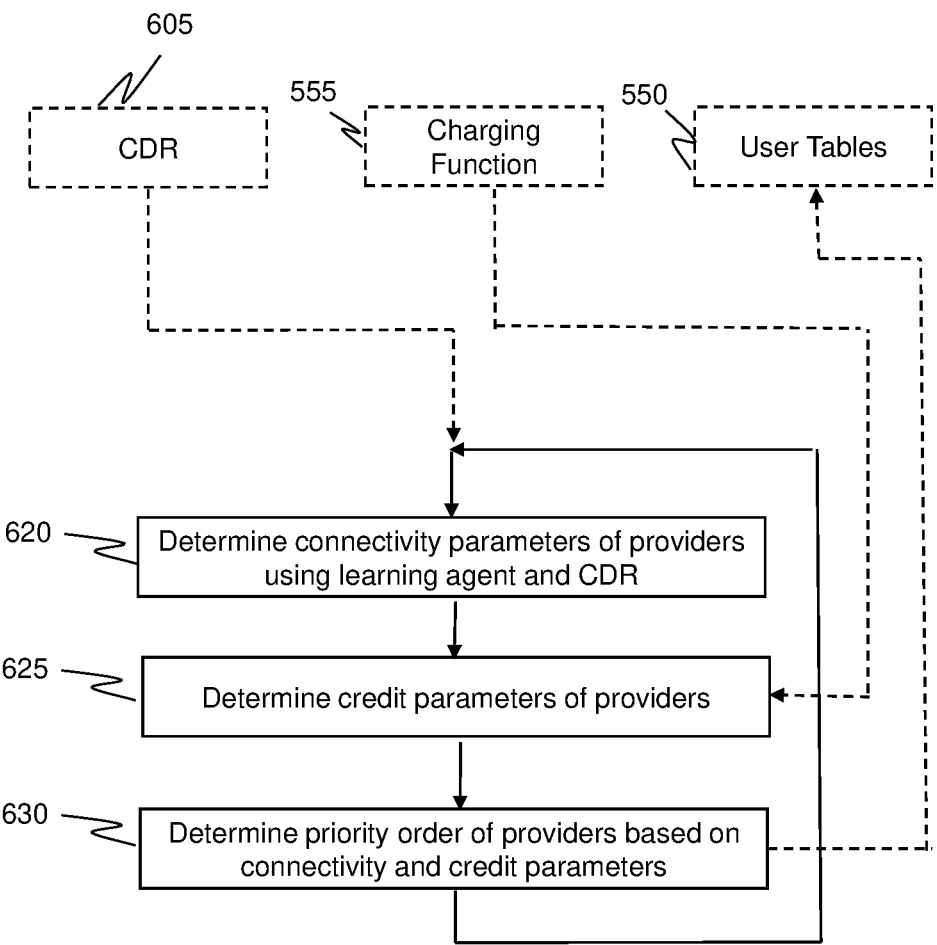
FIG. 6 is a flow chart illustrating steps in a method for updating a user table according to an example.

FIG. 6 illustrates a background method 600 for updating user tables which may be used by the method of FIG. 5. The method may be implemented by the controller of FIG. 4 although other hardware and/or software associated with the network may be used.

The method 600 receives data from a network charging function 555 for example as described above, as well as CDR data 605 from the network. The CDR data may comprise connectivity records such as phone call durations and data transfer amount over a period such as 3 months, between the user and providers. As noted previously, the providers are other users of the network, or a different network, wo may be friends, relatives, peers or other persons that have some social or work interaction with the user, and who are willing to provide a balance transfer to the user. The method 600 also populates or updates a user table 550 for each user wishing to utilize the balance transfer service.

At 620, the method 660 uses the CDR data associated with various providers and the user to determine connectivity parameters for each provider. This may be implemented using a learning agent such as that of FIG. 3.

In this example, the last 3 months CDR data is used to determine and analyze closely connected providers with the consumer based on parameters such as the called number, the frequency and duration of the call established, and number of SMS messages. Various types of learning agents or models may be used, including for example machine learning. In an example, a statistical linear regression model is used to determine a connectivity parameter for several providers.

Considering a set of independent variables $x=[x_1, x_2, x_3, \ldots, x_n]$ where each of the $x_{i,j}$ represents the correlation of the input parameters (i) for the provider (j).

$X_{1.1}$=Total number of calls made to a number (say Provider B) from the consumer.

$X_{2.1}$=Average frequency of the calls made to Provider B.

$X_{3.1}$=Average of the total duration of the calls made to Provider B.

The model's parameters ($\beta i$) represent the value associated for each of the independent variables. Considering a coefficient value 0.5 given to each of the independent variable, the providers score can be formulated as:

$$\text{Score} = \sum_{j=0}^{j=n} \cdot \sum_{i=0}^{i=3} (\beta_i * x_{ij})$$

For each provider from j=0 to n, considering the 3 example inputs with the default coefficient value, the score or connectivity parameter for the consumer connection to the provider is shown in Table 1 below:

TABLE 1

Example metrics for determining connectivity parameters

| Con-sumer | Provider | Total number of calls made | Average frequency of the calls | Average time duration of the calls | Statis-tical score |
|---|---|---|---|---|---|
| A | B | 5 | 2.5 | 60 mins | 33.75 |
| A | C | 10 | 5 | 240 mins | 127.5 |
| A | D | 3 | 1.5 | 40 mins | 22.25 |

These connectivity parameters may then be used to prioritize the providers as shown in Table 2 below:

TABLE 2

Priority ranking of providers

| Provider | Priority |
|---|---|
| C | 1 |
| B | 2 |
| D | 3 |

The connectivity parameters and priority rankings may be stored in the user table 550. In an alternative, the ranking may also depend on the credit parameters of the providers.

At 625, the method 600 determines credit parameters for the providers. This may be implemented simply by interrogating the charging function 555 for a current credit balance of each provider which is the credit parameter. More complex credit parameters may be implemented using rules provided by the provider or user. For example, the provider may specify:

a maximum amount of credit to be transferred to the user
a maximum proportion of a current credit balance to be transferred
dynamic authorization
available credit units of one type which can be used for network resource associated with a different credit unit (e.g. using call credits for data transfer)
preferred units of measure to use The user may specify:

a maximum amount of credit to be transferred from each provider
dynamic authorization (even if not specified by the provider)

These preferences may be setup initially using a suitable Graphical User Interface.

Where dynamic authorization is not required, for each provider an authorization request is sent during service initiation. Along with the request, the providers may be given an option to choose the service from which the units are to be transferred. The credit can then be automatically transferred according to any of the above rules when the user experiences a low balance condition. Where dynamic authorization is required, the balance transfer authorization is not pre-established, but a dynamic request for authorization is sent during the session. It's also possible for providers to deregister from the service. Pre-authorized providers may be preferred by the user over providers requiring dynamic authorization given that the balance transfer is completed more quickly and is therefore less likely to impact the network service the user is using.

The user may manually select providers it wishes to use and the method then updates their connectivity and credit parameters. Alternatively, the method may select the providers based on the CDR data, for example selecting the providers with the 10 highest connectivity parameters.

At 630, the method determines a priority order of providers based on the connectivity and credit parameters and updates the user table 550. This may be implemented by updating Table 2 to account for the effect of the credit parameters. A simple algorithm may be used, for example ranking providers with available credit according to their respective connectivity parameters, with providers having insufficient credit being ranked below even if they have a higher connectivity parameter.

Figure 7:
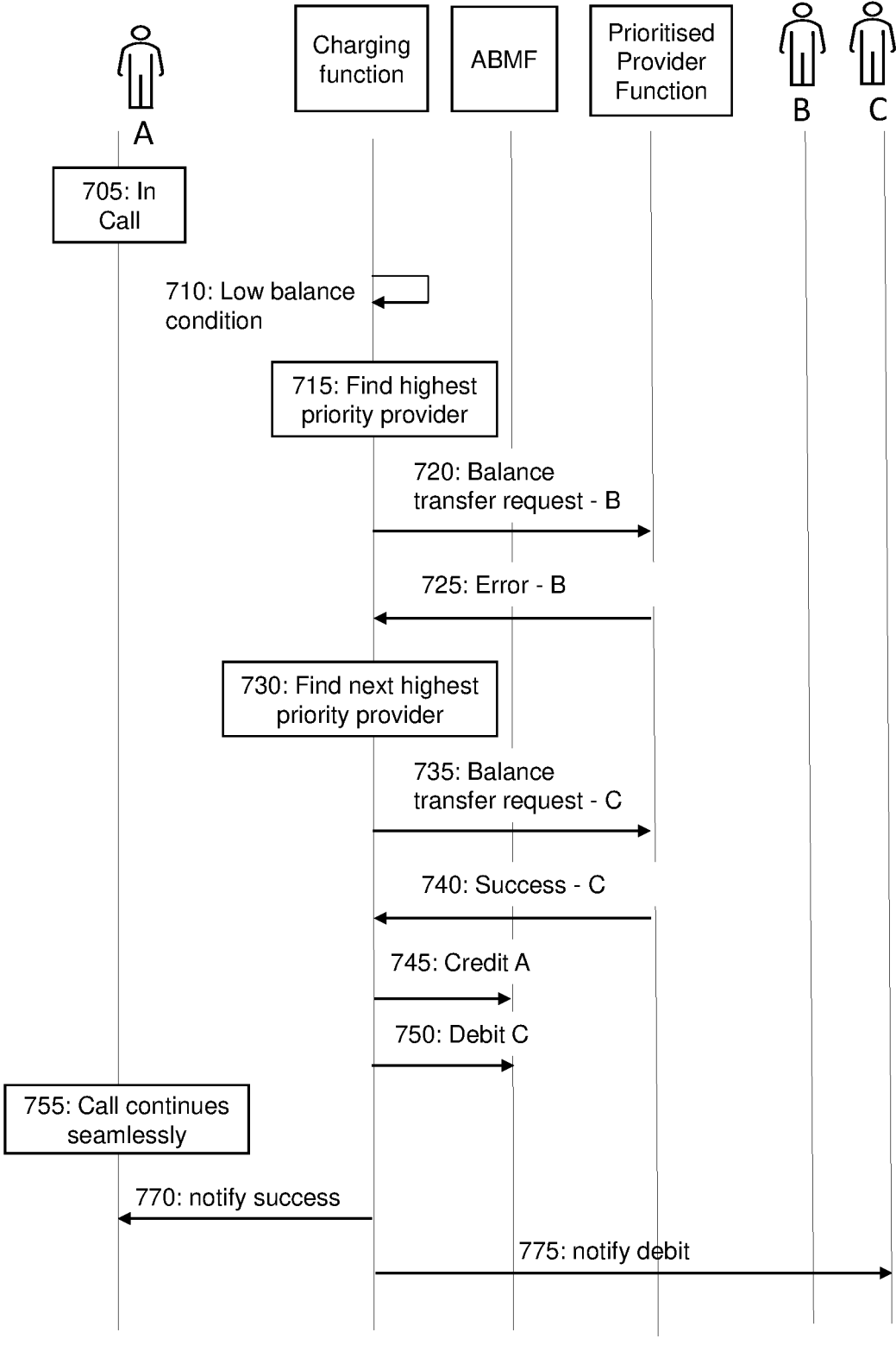
FIG. 7 is a sequence diagram illustrating the flow of signaling in a network according to an example.

FIG. 7 illustrates a flow diagram of signaling and events according to another example. This may be implemented by users/user devices and providers interacting with a charging function (CF), an account balance management function (ABMF) and a prioritized provider function (PPF). These functions may be implemented on one or more hardware nodes of a communications network, for example those operating according to 3GPP standards. This may involve the exchange of standardised messages across different parts of the network, and/or signaling specifically for implementing the described functionality.

At 705, the user A begins a call using the communications network. The CF monitors the user's credit balance for call services according to known 3GPP mechanisms. The CF may be modified or configured to operate as follows. At 710, the CF recognises a low balance condition for the user A, for example that their call credit balance has fallen below 2 minutes. At 715, the CF finds the highest priority provider for that user. This may be implemented by querying the user table 550 or Table 2.

At 720, the CF then sends a Balance transfer request message to the PPF for provider B. The PPF may check the user table or send a dynamic authorization request to provider B depending on provider preferences. At 725 the PPF returns an Error message for provider B indicating either that provider B has insufficient pre-approved credit for transfer or that provider B has refused a dynamic authorization request. This corresponds to a low or zero credit parameter.

At 730, the CF finds the next highest priority provider, for example by querying the user table. This priority may be based on connectivity parameter alone or a combination of connectivity parameter and credit parameter of the provider. Where the priority is also based on a credit parameter, this is indicative that the provider has enough current credit balance to transfer to the user. At 740, the CF forwards a balance transfer request for provider C to the PPF.

The PPF may check the credit parameter for provider C, for example to update this, or where the credit parameter is already taken into account in the priority list of providers used by the CF, the PPF may send a request to the provider C when requiring dynamic authorization and if approved returns a Success message to the CF at 740.

At 745, the CF instructs the ABMF to credit the balance of the user A and at 750, the CF instructs the ABMF to debit the balance of the provider C by the same amount; or where a rating or conversion factor is used the credit and debit instructions are adjusted accordingly. The crediting of the user's account allows the call to continue seamlessly at 755.

At 770, the CF may notify the user A of the balance transfer success, and at 775 the CF may notify the provider C of the debit.

Embodiments may provide several advantages. Balance transfer may be handled seamlessly during use of a network service so that the user does not experience any interruptions to the service. The process is handled automatically and may step through several potential providers until a suitable one is found. The process is also dynamic in managing changing in the availability of credit from different providers over time, for example because of their own use of network services.

The embodiments provide flexibility in how this service may be implemented, including preauthorizing balance transfers or requiring dynamic authorization, configuration by both provider and user as to how much credit to transfer, whether cross-service transfer is available, and enabling balance transfer from providers subscribed to a different network than the user. The operators of these two networks may decide upon a suitable tariff or conversion factor.

Whilst the embodiments are described with respect to 3GPP networks, they may also be used for other networks or services such as WLAN or Wi-Fi provision, audio visual content provision, gaming, and many other applications such as those requiring high availability in 5G use cases.

The controller and other modules of the embodiments may be instantiated in cloud environments such as Docker, Kubernetes or Spark. Alternatively, they may be implemented in dedicated hardware or within the equipment being monitored.

Modifications and other variants of the described embodiment(s) will come to mind to one skilled in the art having the benefit of the teachings presented in the foregoing descriptions and the associated drawings. Therefore, it is understood that the embodiment(s) is/are not limited to the specific examples disclosed and that modifications and other variants are intended to be included within the scope of this disclosure. Although specific terms may be employed herein, they are used in a generic and descriptive sense only and not for purposes of limitation.

The invention claimed is:

1. A method of managing a charging operation in a communications network, the method comprising: determining a low balance condition of a user of the network during a network service provided to the user by the network; and determining a prioritized provider and transferring a credit to the user from the prioritized provider to continue the network service; wherein the prioritized provider is determined from a plurality of providers based on respective connectivity parameters between the user and each provider and a respective credit parameter of each provider; wherein the connectivity parameters are determined using a learning model; wherein determining the prioritized provider comprises determining a priority order of providers using the connectivity parameters and checking the credit parameters of the providers in the priority order until a provider is determined having a credit parameter meeting a credit condition corresponding to continuing the network service for the user.

2. The method of claim 1, wherein the connectivity parameters are determined using call data records, CDR, between the user and respective providers.

3. The method of claim 1 wherein the credit parameter includes one or more of the following: a pre-authorized amount of credit available from the respective provider to the user; a credit balance of the respective provider available to the user upon dynamic authorization by said provider.

4. The method of claim 1, wherein the determination of the prioritized provider is determined automatically using a lookup table updated with connectivity parameters and credit parameters.

5. The method of claim 1, the determination of the prioritized provider is determined automatically using a lookup table updated with connectivity parameters and by requesting credit parameters associated with respective providers according to the priority order.

6. The method of claim 1, the determination of the prioritized provider is determined using a lookup table updated with connectivity parameters and responsive to permission from the providers following requests for transferring credit according to the priority order.

7. The method of claim 4, wherein the lookup table is updated periodically using one or more of the following: provider preference information supplied by the respective provider; user preference information provided by the user; recalculated connectivity parameters; current credit parameters.

8. The method of claim 1, wherein one or more of the providers is subscribed to a different network operator than the user.

9. The method of claim 1, wherein the network service includes one or more of the following: voice or video call; short message service, SMS, messages; data transfer.

10. The method of claim 1, wherein the credit includes one or more of the following: call credits; SMS credits; data transfer credits; money.

11. A controller for managing a charging operation in a communication network, the controller comprising a processor and a memory, the memory containing instructions executable by the processor such that the controller is operable to: determining a low balance condition of a user of the network during a network service provided to the user by the network; and determining a prioritized provider and transferring a credit to the user from the prioritized provider to continue the network service; wherein the prioritized provider is determined from a plurality of providers based on respective connectivity parameters between the user and each provider and a respective credit parameter of each provider; wherein the connectivity parameters are determined using a learning model; wherein determining the prioritized provider comprises determining a priority order of providers using the connectivity parameters and checking the credit parameters of the providers in the priority order until a provider is determined having a credit parameter meeting a credit condition corresponding to continuing the network service for the user.

12. The controller of claim 11, operable to determine the connectivity parameters using call data records, CDR, between the user and respective providers.

13. The controller of claim 11, wherein the credit parameter includes one or more of the following: a pre-authorized amount of credit available from the respective provider to the user; a credit balance of the respective provider available to the user upon dynamic authorization by said provider.

14. The controller of claim 11, operable to determine the prioritized provider automatically using a lookup table updated with connectivity parameters and credit parameters.

15. The controller of claim 11, operable to determine the prioritized provider automatically using a lookup table updated with connectivity parameters and by requesting credit parameters associated with respective providers according to the priority order.

16. The controller of claim 11, operable to determine the prioritized provider using a lookup table updated with connectivity parameters and responsive to permission from the providers following requests for transferring credit according to the priority order.

* * * * *